(12) United States Patent
Savikovsky et al.

(10) Patent No.: US 10,884,257 B2
(45) Date of Patent: Jan. 5, 2021

(54) BACKGROUND LIGHT SUPPRESSION FOR A LASER PROJECTOR

(71) Applicant: FARO Technologies, Inc., Lake Mary, FL (US)

(72) Inventors: Arkady Savikovsky, Burlington, MA (US); Joel H. Stave, New Boston, NH (US); Michael L. Veksland, Mount Laurel, NJ (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 302 days.

(21) Appl. No.: 16/017,360

(22) Filed: Jun. 25, 2018

(65) Prior Publication Data
US 2019/0391409 A1    Dec. 26, 2019

(51) Int. Cl.
G02B 27/48 (2006.01)
G02B 7/04 (2006.01)
G02B 26/08 (2006.01)
G02B 26/10 (2006.01)

(52) U.S. Cl.
CPC .............. *G02B 27/48* (2013.01); *G02B 7/04* (2013.01); *G02B 26/0816* (2013.01); *G02B 26/105* (2013.01)

(58) Field of Classification Search
None
See application file for complete search history.

(56) References Cited

U.S. PATENT DOCUMENTS

| | | | |
|---|---|---|---|
| 5,225,923 A | 7/1993 | Montagu | |
| 6,547,397 B1 | 4/2003 | Kaufman et al. | |
| 7,306,339 B2 | 12/2007 | Kaufman et al. | |
| 7,372,558 B2 | 5/2008 | Kaufman et al. | |
| 8,085,388 B2 | 12/2011 | Kaufman et al. | |
| 8,582,087 B2 | 11/2013 | Kaufman et al. | |
| 9,410,793 B2 | 8/2016 | Kaufman et al. | |
| 9,423,278 B1 | 8/2016 | Kaufman et al. | |
| 9,826,207 B2 | 2/2017 | Kaufman et al. | |
| 9,879,983 B2 | 1/2018 | Kaufman et al. | |
| 2011/0234919 A1 | 9/2011 | Sprague et al. | |
| 2014/0204385 A1* | 7/2014 | Ouyang | G01N 21/47 356/445 |
| 2015/0085108 A1 | 3/2015 | Kaufman et al. | |
| 2016/0128570 A1 | 5/2016 | Creasey et al. | |
| 2017/0038195 A1 | 2/2017 | Kaufman et al. | |
| 2017/0180703 A1 | 6/2017 | Kovacovsky | |

FOREIGN PATENT DOCUMENTS

| | | |
|---|---|---|
| WO | 200144850 A2 | 6/2001 |
| WO | 2009133690 A1 | 11/2009 |

OTHER PUBLICATIONS

Partial European Search for Application No. 19179454.4 dated Oct. 24, 2019; pp. 1-20.
Pears, N. E., et al., "An Intelligent Active Range Sensor for Mobile Robot Guidance" Mechatronics, Pergamon Press, Oxford, GB, vol. 6, No. 7, Oct. 1, 1996 (Oct. 1, 1996), pp. 733-759, XP004047613.

* cited by examiner

*Primary Examiner* — Jennifer D. Carruth
(74) *Attorney, Agent, or Firm* — Cantor Colburn LLP

(57) ABSTRACT

A laser projector steers an outgoing beam of light onto an object, passing light returned from the object through a focusing lens onto an aperture rigidly coupled to an optical detector.

20 Claims, 9 Drawing Sheets

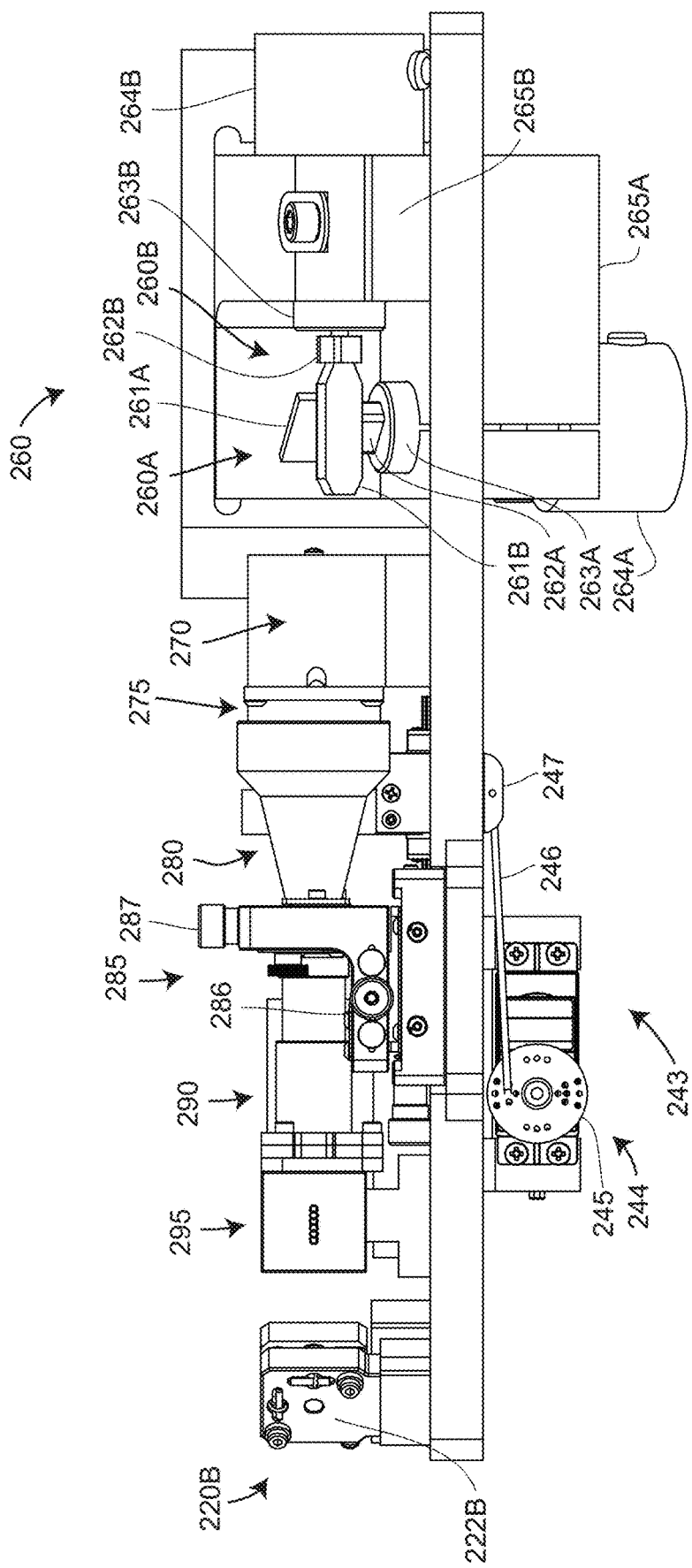

BACKGROUND LIGHT SUPPRESSION FOR A LASER PROJECTOR

BACKGROUND

The subject matter disclosed herein relates to a light projection system, often referred to as a "laser projection system," and in particular to a light projection system that projects a glowing light pattern onto an object without requiring retroreflective or cooperative targets.

Light projection devices are used in a variety of applications to project images onto objects. In some applications, an illuminated three-dimensional (3D) pattern, also referred to as a "template," is projected onto an object. The template may be formed, for example, by projecting a rapidly moving, vector-scan, light beam onto the object. In some systems, the projected light beam is a laser beam. The light beam strikes the surface of the object following a predetermined trajectory in a repetitive manner. When repetitively moved at a sufficiently high beam speed and refresh rate, the trace of the projected beam on the object appears to the human eye as a continuous glowing line. The projected pattern of light appears as the glowing template that can be used to assist in the positioning of parts, components and work pieces. In some cases, the projected template is based partly on computer aided design (CAD) data of the object.

A challenge faced by light projection devices is minimizing noise from unwanted scattered light or from background light in captured images while at the same time ensuring that the light projector operates properly from distances relatively near to the scanner to distances relatively far from the scanner. An additional related challenge is obtaining quality scanned images from black objects that return very little light to white objects that return high levels of light.

Accordingly, while existing systems and methods of patterned light projection are suitable for their intended purposes, the need for improvement remains, particularly in suppressing unwanted scattered light while retaining the ability to measure from near to far with high dynamic range.

BRIEF DESCRIPTION

According to one aspect of the disclosure, an apparatus comprises: a light source operable to emit a beam of outgoing light; a beam-steering system operable to steer the beam of outgoing light onto an object; a first focusing lens operable to receive light returned from the object; an aperture operable to receive light from the first focusing lens; and an optical detector rigidly coupled to the aperture.

According to yet another aspect of the disclosure, a method comprises: providing a light source, a beam-steering system, a first focusing lens, an aperture, and an optical detector rigidly coupled to the aperture; emitting a beam of outgoing light with the light source; steering the beam of outgoing light onto an object with the beam-steering system; receiving through the first focusing lens light returned from the object; and sending the returned light through the aperture and onto the optical detector.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIGS. 2A, 2B, 2C are isometric, top, and side views, respectively, of optical and electro-optical elements of the light projector according to an embodiment of the present invention;

The detailed description explains embodiments of the disclosure, together with advantages and features, by way of example with reference to the drawings.

DETAILED DESCRIPTION

Embodiments of the present invention provide improved operating range and operating consistency for a light projector device.

Figure 1B:
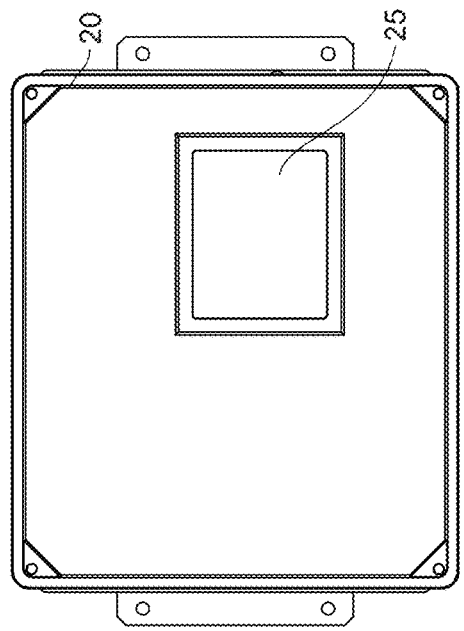
FIGS. 1A, 1B, 1C are isometric, front, and bottom views, respectively, of a light projector according to an embodiment of the present invention.
Figure 1C:
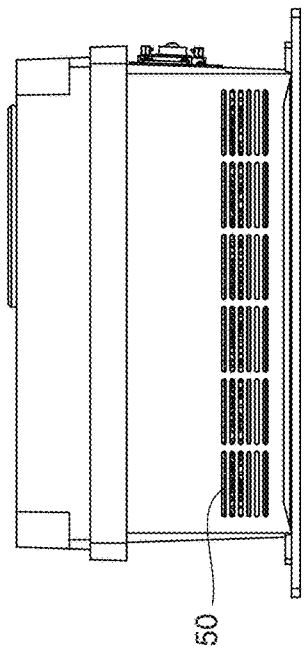
Figure 1A:
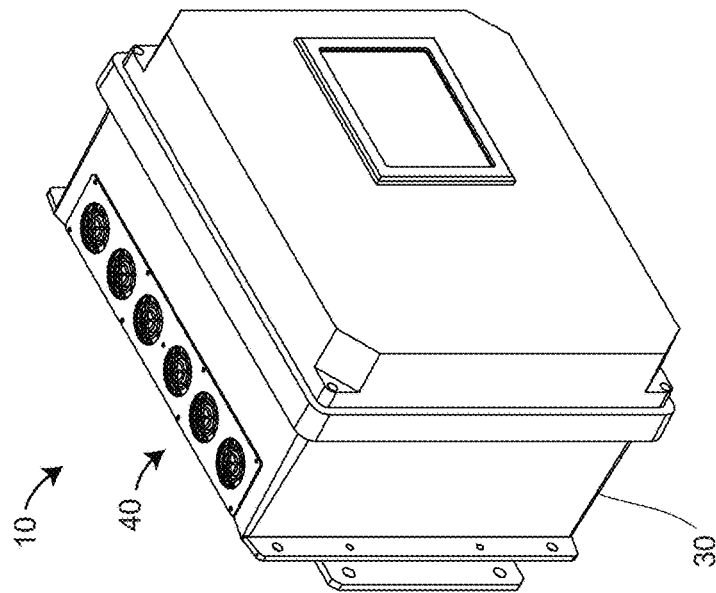
Figure 2A:
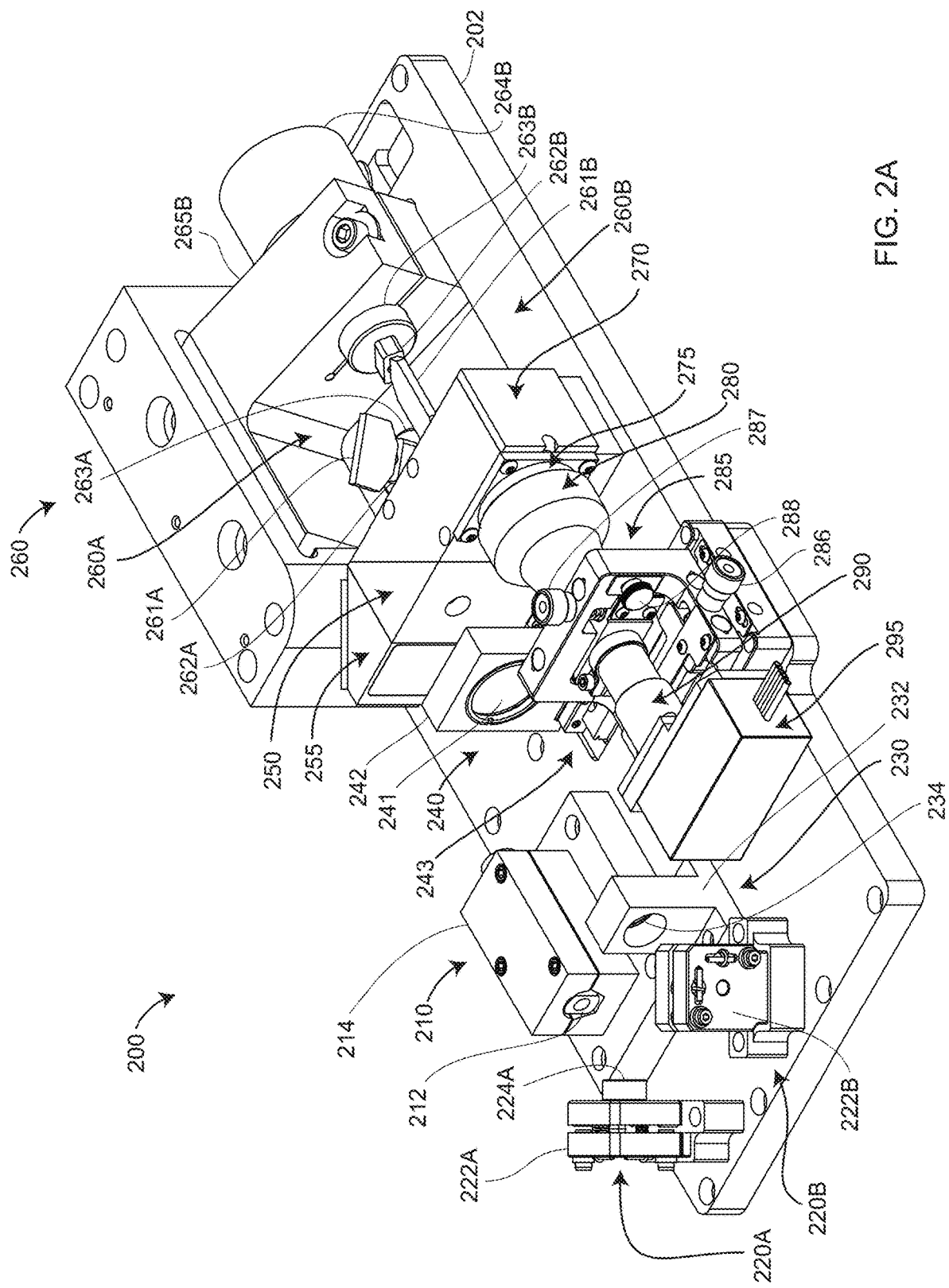
Figure 2B:
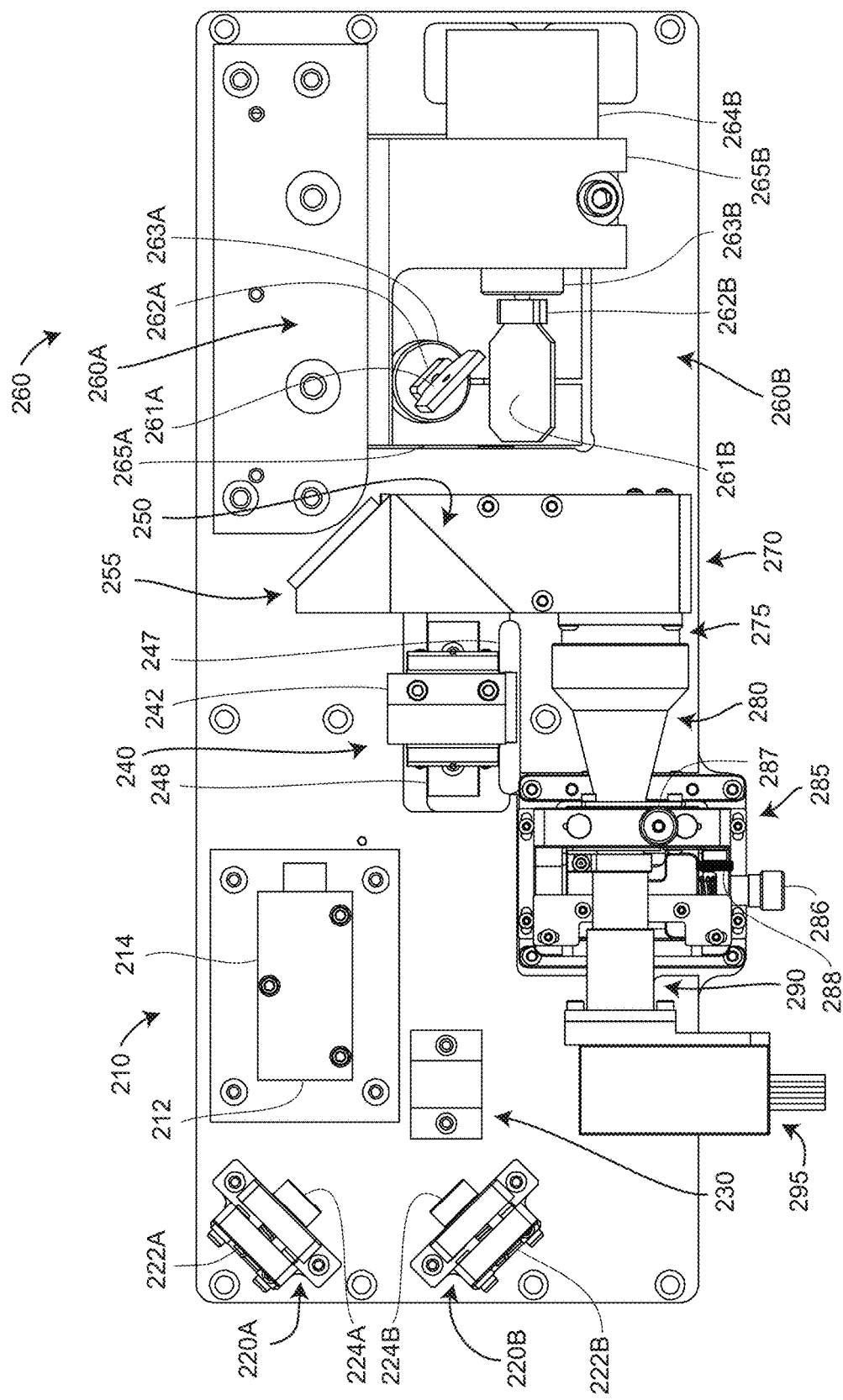
Figure 2D:
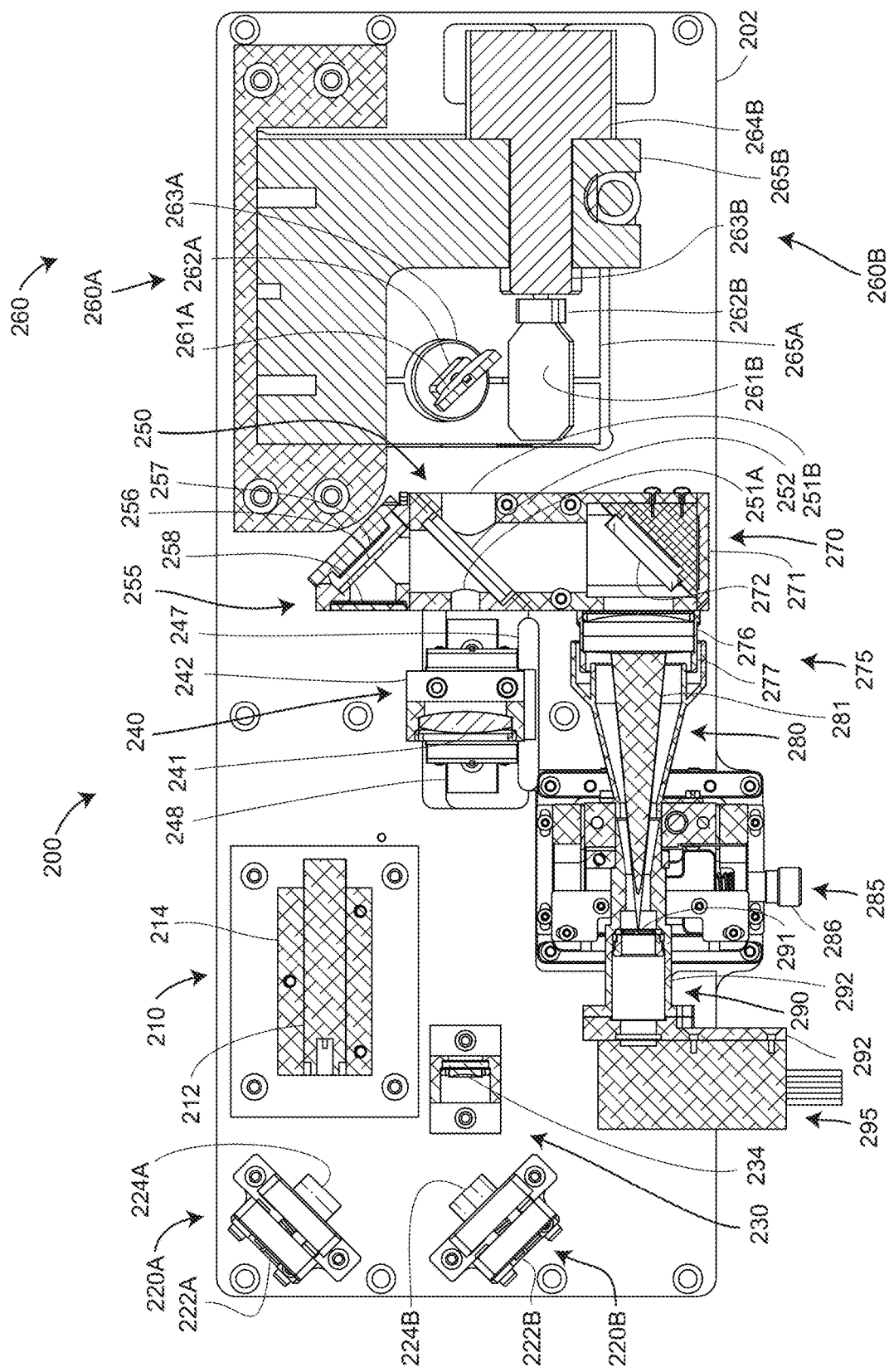
FIG. 2D is a cross-sectional view of an optical and electro-optical elements of the light projector according to an embodiment of the present invention.

FIGS. 1A, 1B, 1C are isometric, front, and bottom views of a light projector 10 according to an embodiment of the present invention. In an embodiment, the light projector 10 includes a front cover 20, a window 25, a base housing 30, a fan assembly 40, and venting slots 50. In an embodiment, a beam of light is sent out of and returned back through the window 25.

FIGS. 2A, 2B, 2C, 2D are isometric, top, side, and cross-sectional views, respectively, of an electro-optical plate assembly 200 within the light projector 10. In an embodiment, the light projector 10 includes a mounting plate 202, a light source assembly 210, fold mirror assemblies, 220A, 220B, expanding lens assembly 230, collimating/focusing lens assembly 240, beamsplitter assembly 250, two-axis beam-steering assembly 260, reflector mirror assembly 270, focusing lens assembly 275, In an embodiment, the light source assembly 210 includes a light source 212 and a mounting block 214. In an embodiment, the light source 212 is a diode-pumped solid state laser (DPSS) that emits a round beam of green laser light having a wavelength of about 532 nm. In other embodiments, the light source 212 is a different type of laser such as a diode laser or is a non-laser source. In an embodiment, the fold mirror assemblies 220A, 220B include fold mirrors 224A, 224B, respectively, and adjustable mirror mounts 222A, 222B, respectively. In an embodiment, light from the light source reflects off the fold mirrors 224A, 224B and then travels through a beam expander 230, which includes a beam expander lens 234 and a beam expander mount 232. The expanded beam of light from the beam expander 230 travels through a collimating/focusing lens assembly 240, which acts to focus the beam leaving the light projector 10 onto an object of interest. Because the light leaving the light projector 10 is relatively far from the light projector 10, the beam of light is nearly collimated and converges relatively slowly to a focused spot. In an embodiment, the collimating/focusing lens assembly 240 includes a lens 241, a lens mount 242, and a motorized focusing stage 243. The motorized focusing stage 243 adjusts the position of the lens 241 and lens mount 242 to focus the beam of light onto the object of interest. In an embodiment, the motorized focusing stage 243 includes a servomotor assembly 244 that drives a rotary actuator 245 attached to shaft 246 affixed to an attachment 247. As the rotary actuator 245 rotates, it causes the lens mount 242 to be translated on a ball slide 248.

In an embodiment, the beamsplitter assembly 250 includes entrance aperture 251A, exit aperture 251B, and beamsplitter 252. In an embodiment, the beamsplitter 252 is a 50/50 beamsplitter, which is to say that the beamsplitter 252 transmits half and reflects half the incident optical power. Half of the light arriving at the beamsplitter assembly 250 from the collimating/focusing lens assembly 240 is reflected onto a beam absorber assembly 255, which absorbs almost all the light, thereby keeping unwanted reflected light from passing back into the electro-optical plate assembly 200. In an embodiment, the beam absorber assembly 255 includes a neutral density filter 256, a felt absorber 257, and a felt absorber 258.

Figure 4:
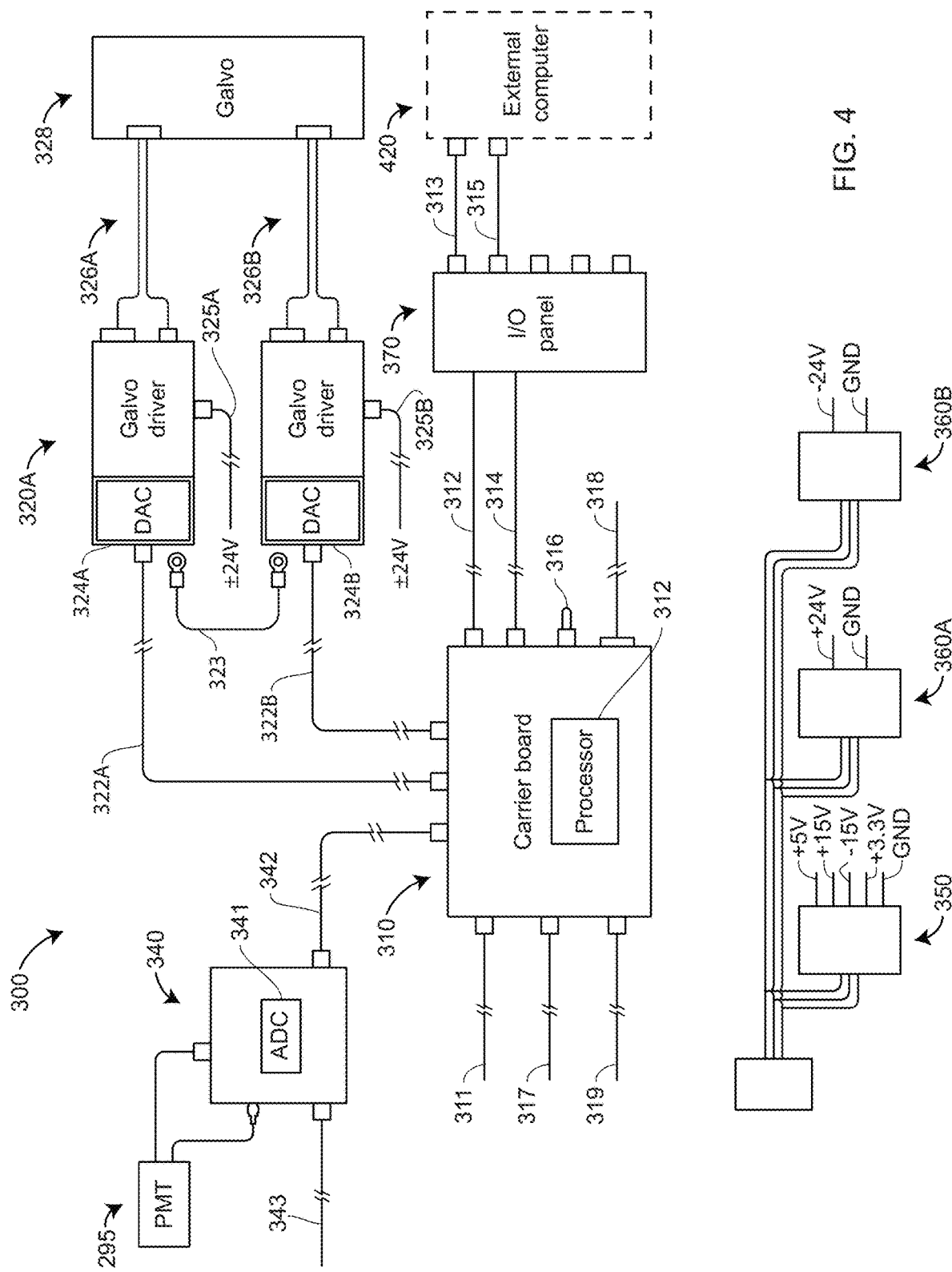
FIG. 4 is an electrical block diagram of the light projector according to an embodiment of the present invention.

The two-axis beam-steering assembly 260 includes beam steering assemblies 260A, 260B. Each beam steering assembly 260A, 260B includes respectively a light weight mirror 261A, 261B, a mirror mount 262A, 262B, a motor 263A, 263B, a position detector 264A, 264B, and a mounting block 265A, 265B. The first mirror 261A steers the beam of light to the second mirror 261B, which steers the beam out of the window 25 to the object of interest. The beam-steering assembly 260 steers the beam in each of two orthogonal axes, sometimes referred to as x-y axes. In an embodiment, the beam-steering assembly 260 is provided steering directions to move the beam of light in a predetermined pattern by a processor 312 (FIG. 4). Light reflected or scattered off the object of interest retraces the outgoing path, striking first the mirror 261B and then the mirror 261A before passing through the exit aperture 251B, and reflecting off the beamsplitter 252. Beam steering assemblies such as 260A, 260B are also each referred to as galvanometers or galvos, which is an electromechanical device that works as an actuator that produces a rotary deflection, in this case of the mirrors 261A, 261B.

The mirror assembly 270 includes mount 271 and return mirror 272. The focusing mirror assembly 275 includes focusing lens 276 and lens mount 277. In an embodiment, light arriving at the return mirror 272 from the beamsplitter 252 passes through the focusing lens 276. In an embodiment, the focusing lens 276 is a doublet. In an embodiment, an opaque cone 280 smoothly slides over lens mount 277 and attaches rigidly to adjustment stage 285. The purpose of the opaque cone 280 is to block background light from within the light projector 10 from contaminating the light emitted by the light source 210 and reflected off the object of interest and passing through the lens 276. Aperture assembly includes aperture 291 and aperture mount 292. In an embodiment, the aperture assembly 290 is rigidly affixed to the optical detector assembly 295 by an interface element 292. In an embodiment, the aperture assembly 290 is further rigidly coupled to the adjustment stage 285. The adjustment stage 285 is adjusted in the x direction by an x adjuster 286, in they direction by a y adjuster 287, and in the z direction by a z adjuster 288. The purpose of the adjustment stage 285 is to adjust the position of the aperture 291 and the optical detector assembly 295 in x, y, and z relative to the beam of light to enable the focused beam of light 281 to pass through the aperture for the object of interest located within the rated range of distances of the object being scanned with the light from the light projector 10. The purpose of the aperture is to block unwanted background light, especially light scattered from within the enclosure of the laser projector 10, for example, off the mirrors 216A, 216B, the beamsplitter 252, the components of the beam block 255, the return mirror 272, and the focusing lens 276. In addition, the aperture 291 helps to block unwanted background light from the environment outside the enclosure of the light projector 10. Examples of such unwanted background light blocked by the aperture include artificial light and sunlight, both direct and reflected.

In an embodiment, the aperture 291 is a circular aperture. In an embodiment, the circular aperture has a diameter of 150 micrometers and a centering accuracy of +/−20 micrometers. A circular aperture is often referred to as a pinhole, and the element 291 may alternatively be referred to as an aperture or a pinhole. In other embodiments, the aperture is not circular but has another shape.

The optical detector assembly 295 receives light on an optical detector within the assembly 295 and produces an electrical signal in response. In an embodiment, the optical detector is a photomultiplier tube (PMT). In an embodiment, the PMT is includes a high-voltage supply circuit and a low-noise amplifier. In an embodiment, the amplifier is connected close to the PMT anode output pin to reduce the effect of external noise on the produced electrical signal. In an embodiment, the PMT is a Hamamatsu H11903 photosensor manufactured by Hamamatsu Photonics K.K., with headquarters in Shimokanzo, Japan. An advantage of a PMT for the present application includes high sensitivity to small optical powers and ability to measure both very weak optical signals and very strong optical signals. In an embodiment, the gain of the PMT can be adjusted by a factor of 100,000 or more according to the selected gain level, which is determined by the voltage applied to the PMT. This wide range of achievable gains enables the light projector to measure object regions ranging from dark black to bright white or shiny (i.e. highly reflective).

Figure 5A:
FIG. 5A, FIG. 5B and FIG. 5C are illustrations showing three different line widths obtained an object in a procedure for adjusting focusing of the light emitted by the light projector on an object according to an embodiment of the present invention.
Figure 5B:
Figure 5C:
Figure 6A:
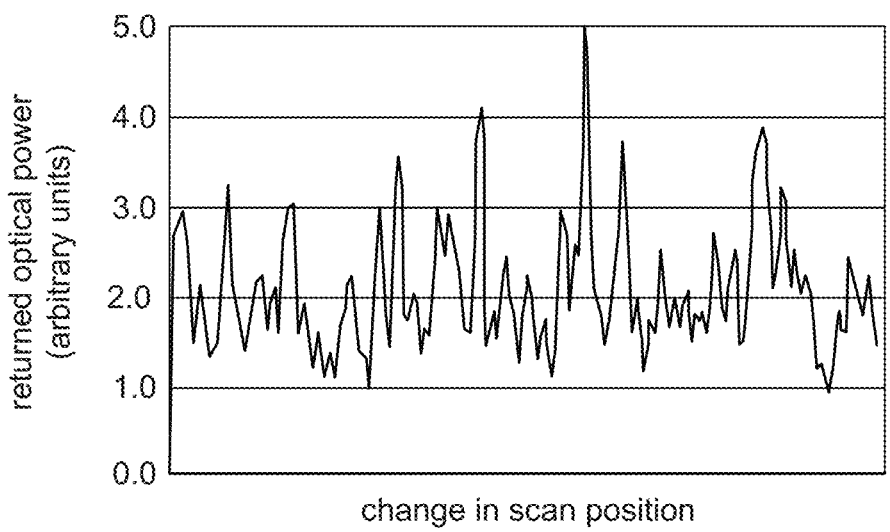
FIG. 6A, FIG. 6B and FIG. 6C are plots showing relative optical power returned as a function of scanning position for the three focusing conditions of FIG. 5A, FIG. 5B and FIG. 5C according to an embodiment of the present invention.
Figure 6B:
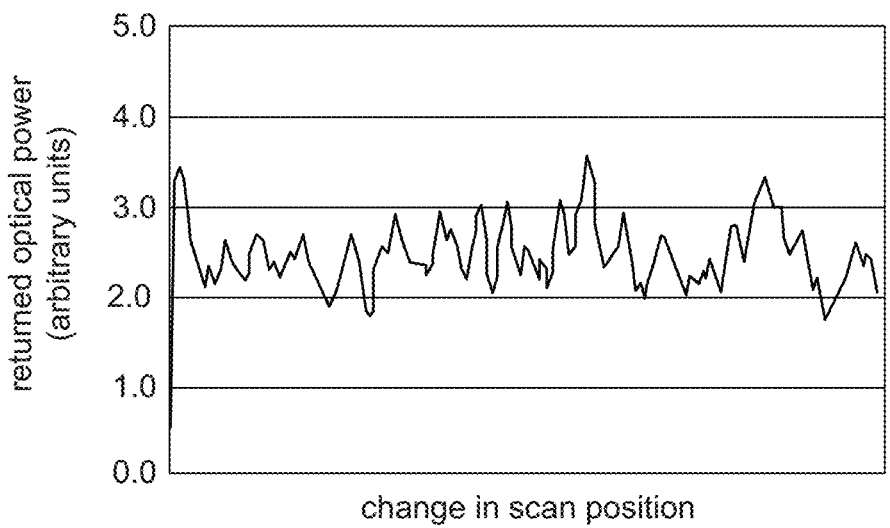
Figure 6C:
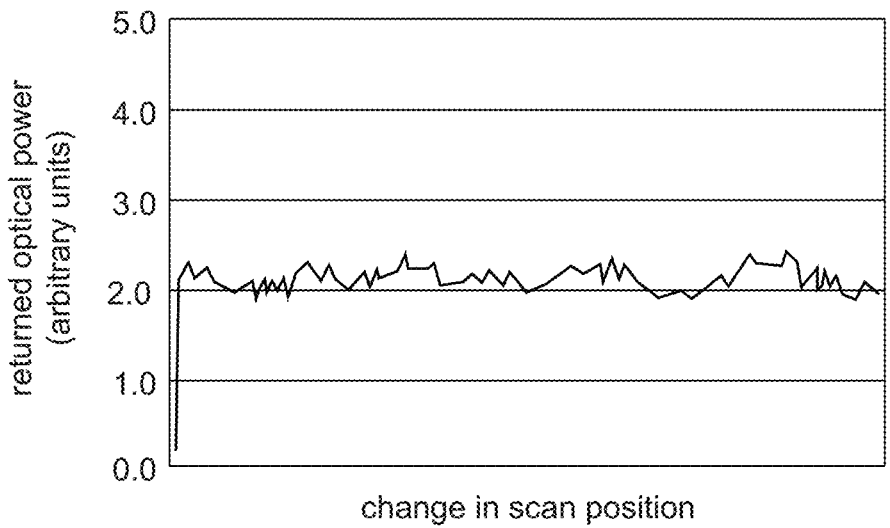

As explained herein above, the motorized focusing stage 243 adjusts the position of the lens 241 and lens mount 242 to focus the beam of light from the light projector 10 onto the object of interest. A method for determining the correct focusing position for the motorized stage 243 is now described with reference to FIG. 5A, FIG. 5B, and FIG. 5C and FIG. 6A, FIG. 6B, and FIG. 6C. In an embodiment, the motorized focusing stage 243 adjusts the position of the collimating/focusing lens assembly 240 to each of several positions, thereby producing scanning lines of different widths as illustrated in FIG. 5A, FIG. 5B, and FIG. 5C. FIG. 5A shows the case in which the scanning line is adjusted to its minimum width, while FIG. 5B and FIG. 5C illustrate wider out-of-focus scanner lines produced by non-optimum focusing of the lens 241 by the motorized focusing stage 243. In an embodiment, the desired focusing of the collimating/focusing lens assembly 240 is found by stepping the lens 241 to each of several positions. At each of those positions, the galvo mirrors 261A, 261B are used to steer the projected light along a line. An example is shown in FIG. 6A, FIG. 6B, and FIG. 6C, where the observed relative optical powers observed for each correspond to the levels of focus illustrated in FIG. 5A, FIG. 5B, and FIG. 5C, respectively. As can be seen in FIG. 5A-FIG. 5C and FIG. 6A-FIG. 6C, improved focus corresponds to relatively larger variations in the returned optical power as received by the optical detector assembly 295 as the beam is steered from point to point on the object of interest. Note that the average level of optical power in each of FIG. 6A, FIG. 6B, and FIG. 6C is the same, namely about 2.0 arbitrary units (au), in each of FIG. 6A, FIG. 6B, and FIG. 6C. In contrast, the peak relative optical power observed in FIG. 6A in around 5.0 au, around 3.0 au higher than the average value, while the peak relative optical power observed in FIG. 6C is only around 2.5 au, which is only around 0.5 au higher than the average relative optical power. Without being bound to a particular theory, it is believed the reason for this change in relative optical power level is speckle, which is an effect in which laser light scattered off different portions of an object interfere constructively or destructively to produce the fluctuations in returned optical power. When a laser beam is focused, the relative change in the returned optical power is increased as the beam is swept along the object. In an embodiment, the motorized focusing stage 243 is adjusted until the maximum change in relative optical power is achieved in scanning a line. This ensures that the lens 241 has been adjusted to the position of optimal focus.

In an embodiment, a pre-scan is performed to determine the desired level of gain for a given scan region. For example, if a region is scanned with some elements in the region having a relatively high reflectance, for example because the elements are white, the gain of the PMT is set to a relatively low value since the optical power returned to the PMT is relatively high. On the other hand, if scanning is performed on a region containing only elements having relatively low reflectance, for example because the elements are black or dark, the gain of the PMT is set to a relatively high value. In an embodiment, a pre-scan is performed on a region to be measured as a way to obtain relatively high measurement sensitivity without saturating the PMT. In other words, the use of a pre-scan enables relatively dark objects to be measured even at relatively large distances from the light projector 10. When a region includes both white or light objects as well as black or dark objects, in an embodiment, the region may be broken into sub-regions, with separate scans performed for at least some of the sub-regions.

The light from the light source 212 that leaves the light projector 10 travels to the object of interest and scatters off the object in a solid angle, afterwards retracing its path as it returns to the light projector 10. After reflecting off the mirrors 261B, 261A, the solid angle of returning scattered light is limited in size by the exit aperture 251B. The light then reflects off beam splitter 252 before passing through the lens 276 to form the focused light beam 281. The direction of focused light beam 281 is determined by the path from a first point at which light from the light projector 10 strikes the object to a second point through the center of the entrance pupil of the lens 276. In an embodiment, the aperture 291 is further aligned to the path that extends from the first point to the second point and into the optical detector assembly 295. Furthermore, in an embodiment, the position of the aperture 291 as adjusted in the z direction to cause the beam waist of the returning beam of light to pass through the aperture 291 when the object is in the range of 5 to 7 meters from the light projector 10. In an embodiment, the aperture 291 is large enough to pass nearly all of the return light through the exit aperture 251B onto the active area of the optical detector at the range of 5 to 7 meters. In an embodiment, the light begins to clip slightly at larger distances such as 10 to 15 meters from the light projector 10. At distances closer to the light projector 10 than 5 meters, the light will clip more significantly, but this is not usually a problem because the optical power scattered off an object point closer than 5 meters has larger scattered intensity than light scattered off an object point farther from the light projector 10.

In an embodiment, the aperture 291 is rigidly affixed to the aperture assembly 290, which in turn is rigidly affixed to the optical detector assembly 295. In an embodiment, the optical detector assembly 295 and aperture assembly 290 are further aligned to ensure that returning light passing through the center of the entrance pupil of the lens 276 not only passes through the center of aperture 291 but also the center of the active area of the optical detector in the optical detector assembly 295. As a result, the range of operation of the light projector 10 is made as large as possible. This is to say that the rigid attachment of the aperture 291 to the photodetector assembly 295 in combination with alignment of the aperture 291, the photodetector assembly 295, the lens 276, and the exit aperture 251B helps to ensure that the best sensitivity is obtained for objects both near to and far from the light projector 10. With this alignment, the pre-scan is also expected to give consistent results in determining the PMT gain settings required for each combination of object distance and object reflectance.

Figure 3:
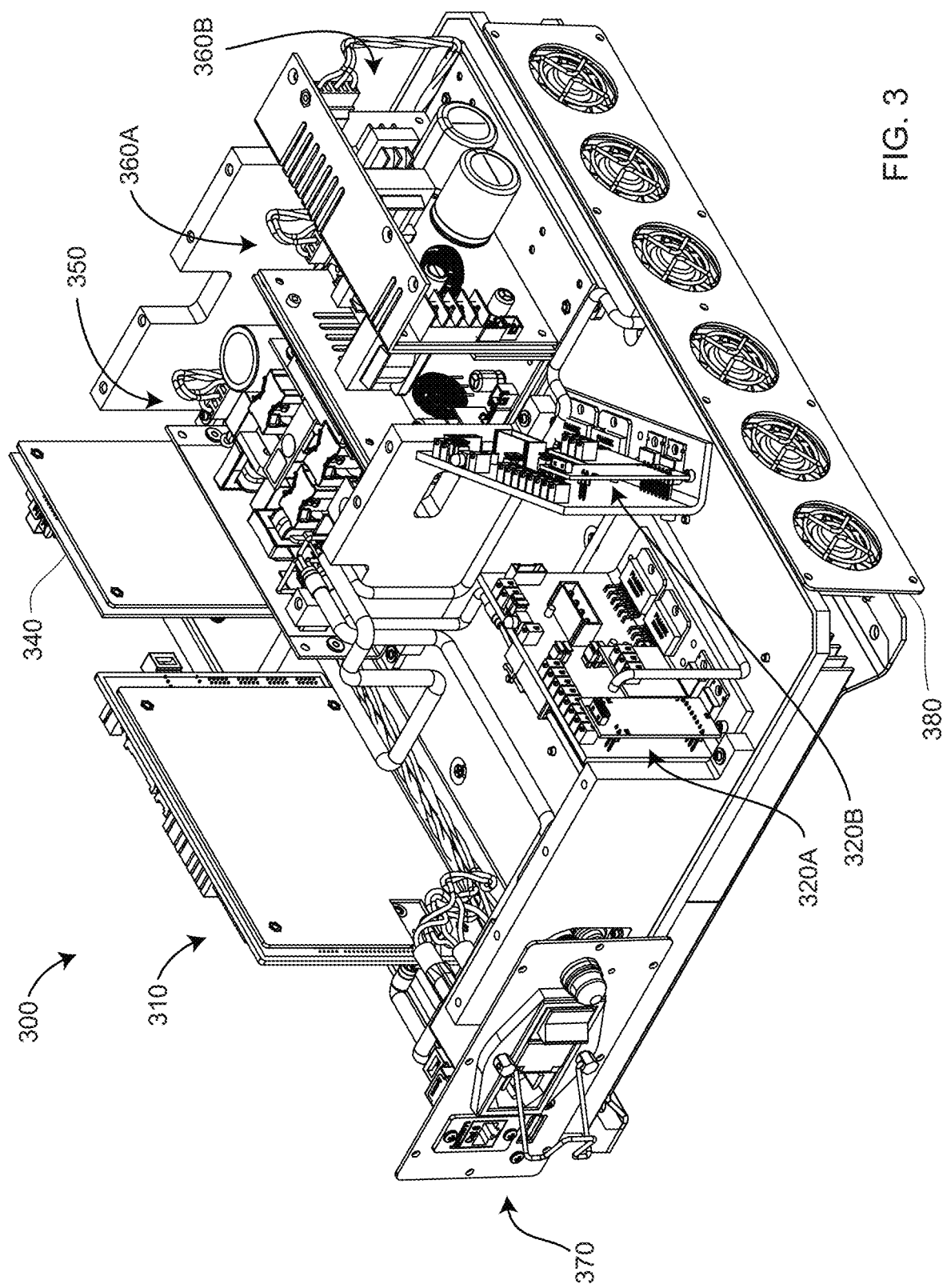
FIG. 3 is an isometric view of electrical components within the light projector according to an embodiment of the present invention.

FIG. 3 is an isometric view of the electrical assembly 300 within the light projector 10, and FIG. 4 is an electrical block diagram for the light projector 10. The electrical assembly 300 includes an electronics plate 302 and a number of circuit boards including a carrier board 310, first galvo driver 320A, second galvo driver 320B, analog circuit 340, multi-voltage power supply 350, +24 volt power supply 360A, and −24 volt power supply 360B. The circuit block diagram representation for the electrical assembly 300 is shown in FIG. 4. The carrier board 310 includes a processor 312 that controls many functions within the light projector 10. Control cables 322A, 322B run from the carrier board 310 to digital-to-analog converters (DACs) 324A, 324B on the first and second galvo driver boards 320A, 320B, respectively. Control signals sent from the carrier board 310 to the DACs 324A, 324B control the angles of the mirrors 261A, 261B, thereby controlling the direction to which the beam is steered. Power supplies 360A, 360B supply +24 volts, −24 volts, respectively, to the galvo drivers 320A, 320B, which in turn supply voltages to the galvo motor/position-sensing components 328 through cables 326A, 326B. In an embodiment, a jumper cable 232 is used to connect the first and second galvo driver boards 320A, 320B when synchronized steering is needed in two dimensions (such as X and Y directions).

The analog circuit board 340 includes an analog-to-digital converter (ADC) 341. The ADC 341 receives an analog electrical signals from the optical detector 295, which in an embodiment is a PMT. The ADC 341 converts the analog signals into digital electrical signals, which it sends over an Ethernet cable 342 to the carrier board 310. The carrier board provides the digital data to the processor 312 and, in an embodiment, to an external computer attached to input/output (I/O) panel 370 through a USB cables 313, 314, an Ethernet cable 315, 316, and/or a wireless channel. In an embodiment, the processor 312 or external computer 420 constructs a gray-scale image of the optical powers received by optical detector 295. Such an image may be displayed to a user, may be used to identify features in the scanned object, and may be used for other functions such as setting the position of the focusing lens 241 with the motorized focusing stage 243. In an embodiment, the analog circuit board 340 receives voltages over the cable 343 from the multi-voltage power supply 350. In an embodiment, the carrier board 310 further provides control signals to the motorized focusing stage 243 over the cable 317 and control signals to the light source 212 over the cable 318. A connector 316 is attached to the circuit board to override the laser bypass circuit. In an embodiment, the carrier board 310 is further provided with a cable 319 operable to send a signal to reset the software on the carrier board. The carrier board 310 receives voltages over the cable 311 from the multi-voltage power supply 350. In an embodiment, additional voltages are provided from the multi-voltage power supply 350 to the I/O panel 370 and to the fan assembly 380.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An apparatus comprising:
a light source operable to emit a beam of outgoing light;
a beam-steering system operable to steer the beam of outgoing light onto an object;
a first focusing lens operable to receive light returned from the object;
an aperture operable to receive light from the first focusing lens;
an optical detector rigidly coupled to the aperture; and
an adjustment stage configured to adjust the aperture in x-, y-, and x-directions, wherein adjustment in the z-direction changes a distance between the aperture and the optical detector.

2. The apparatus of claim 1 further comprising an opaque cone rigidly coupled to the aperture.

3. The apparatus of claim 1 wherein the aperture is a circular aperture.

4. The apparatus of claim 1 wherein the beam-steering system comprises a pair of mirrors, each mirror coupled to a galvanometer, each galvanometer having a motor and a position sensor.

5. The apparatus of claim 1 further comprising a second lens assembly operable to focus the beam of outgoing light on the object.

6. The apparatus of claim 5 wherein the second lens assembly further comprises:
a second lens operable to receive light generated by the light source; and
a motorized focusing stage operable to adjust a position of the second lens to focus the beam of outgoing light on the object.

7. The apparatus of claim 1 wherein the optical detector comprises a photomultiplier tube.

8. A method comprising:
providing a light source, a beam-steering system, a first focusing lens, an aperture, an optical detector rigidly coupled to the aperture, and an adjustment stage;
emitting a beam of outgoing light with the light source;
steering the beam of outgoing light onto an object with the beam-steering system;
receiving through the first focusing lens light returned from the object; and
adjusting the adjustment stage in an x-, y-, and z-direction to pass the returned light onto the aperture, wherein the z-direction adjustment changes a distance between the aperture and the optical detector.

9. The method of claim 8 further comprising aligning the aperture to pass the light received from the first focusing lens through a center of the aperture.

10. The method of claim 8 further comprising aligning the optical detector to center received light onto an active area of the optical detector.

11. The method of claim 8 further comprising:
aligning the position of the optical detector to center light received through the aperture onto an active area of the optical detector; and
rigidly affixing the optical detector to the aperture.

12. The method of claim 8 further comprising focusing the beam of outgoing light onto the object with a second lens assembly, the second lens assembly having a second lens and a motorized focusing stage.

13. The method of claim 12 further comprising adjusting a position of the second lens with the motorized focusing stage.

14. The method of claim 12 further comprising adjusting the position of the second lens based at least in part on relative change in optical power received by the optical detector as the focused beam of light is moved on the object.

15. The method of claim 8 further comprising:
providing a processor; and
steering the beam of outgoing light onto an object in a predetermined pattern based at least in part on steering directions provided by the processor.

16. An apparatus comprising:
a light source operable to emit a beam of outgoing light;
a beam-steering system operable to steer the beam of outgoing light onto an object;
a first focusing lens operable to receive light returned from the object;
an aperture operable to receive light from the first focusing lens;
an optical detector rigidly coupled to the aperture; and
a second lens assembly operable to focus the beam of outgoing light on the object.

17. The apparatus of claim 16, wherein the second lens assembly comprises:
a second lens operable to receive light generated by the light source; and a motorized focusing stage operable to adjust a position of the second lens to focus the beam of outgoing light on the object.

18. The apparatus of claim 16, further comprising an opaque cone rigidly coupled to the aperture.

19. The apparatus of claim 16, further comprising an adjustment stage operable to adjust a position of the aperture and the optical detector.

20. The apparatus of claim 16, wherein the beam-steering system comprises a pair of mirrors, each mirror coupled to a galvanometer, each galvanometer having a motor and a position sensor.

\* \* \* \* \*